(12) United States Patent
Liao

(10) Patent No.: US 9,078,197 B2
(45) Date of Patent: Jul. 7, 2015

(54) METHOD OF HANDLING ACCESS NETWORK DISCOVERY AND SELECTION FUNCTION AND RELATED COMMUNICATION DEVICE

(75) Inventor: Ching-Yu Liao, Taoyuan County (TW)

(73) Assignee: HTC Corporation, Taoyuan District, Taoyuan (TW)

(*) Notice: Subject to any disclaimer, the term of this patent is extended or adjusted under 35 U.S.C. 154(b) by 0 days.

(21) Appl. No.: 13/543,899

(22) Filed: Jul. 9, 2012

(65) Prior Publication Data

US 2013/0012182 A1    Jan. 10, 2013

Related U.S. Application Data

(60) Provisional application No. 61/505,529, filed on Jul. 7, 2011.

(51) Int. Cl.
| | |
|---|---|
| *H04M 3/00* | (2006.01) |
| *H04W 48/16* | (2009.01) |
| *H04W 48/02* | (2009.01) |

(52) U.S. Cl.
CPC .............. *H04W 48/16* (2013.01); *H04W 48/02* (2013.01)

(58) Field of Classification Search
CPC .............................. H04W 48/16; H04W 36/14
USPC ................... 455/426.1, 11.1; 370/338, 331
See application file for complete search history.

(56) References Cited

U.S. PATENT DOCUMENTS

| | | |
|---|---|---|
| 2007/0220558 A1 | 9/2007 | Jung et al. |
| 2009/0270092 A1 | 10/2009 | Buckley |
| 2010/0182929 A1 | 7/2010 | Abraham |
| 2010/0279684 A1* | 11/2010 | Salkintzis ..................... 455/434 |
| 2011/0103261 A1 | 5/2011 | Duan |

(Continued)

FOREIGN PATENT DOCUMENTS

| | | | |
|---|---|---|---|
| CN | 101427517 A | | 5/2009 |
| CN | 101801060 A | | 8/2010 |
| CN | 101990274 A | * | 3/2011 |

OTHER PUBLICATIONS

3GPP TS 23.401 V10.4.0 (Jun. 2011) Technical Specification 3rd Generation Partnership Project; Technical Specification Group Services and System Aspects; General Packet Radio Service (GPRS) enhancements for Evolved Universal Terrestrial Radio Access Network (E-UTRAN) access (Release 10).

(Continued)

*Primary Examiner* — David Q Nguyen
(74) *Attorney, Agent, or Firm* — Winston Hsu; Scott Margo

(57) ABSTRACT

A method of handling an access network discovery and selection function (ANDSF) for a network of a wireless communication system is disclosed. The method comprises determining a first plurality of closed subscriber group (CSG) cells of the wireless communication system with a first CSG identity, for a mobile device of the wireless communication system to communicate with an evolved packet core (EPC) network of the wireless communication system via the first plurality of CSG cells, after the network determines the 3rd Generation Partnership Project (3GPP) as an access technology for the mobile device; and configuring an inter-system mobility policy (ISMP) node such that a value of an AccessTechnology leaf of a PrioritizedAccess node is configured as the 3GPP, and a value of a first AccessId leaf of the PrioritizedAccess node is configured as the first CSG identity of the first plurality of CSG cells.

10 Claims, 12 Drawing Sheets

(56) References Cited

U.S. PATENT DOCUMENTS

2011/0142006 A1* 6/2011 Sachs .............................. 370/331
2011/0170517 A1* 7/2011 Bakker et al. .................. 370/331
2012/0021725 A1* 1/2012 Rune .............................. 455/411

OTHER PUBLICATIONS

3GPP TS 23.402 V10.4.0 (Jun. 2011) Technical Specification 3rd Generation Partnership Project; Technical Specification Group Services and System Aspects; Architecture enhancements for non-3GPP accesses (Release 10).

3GPP TS 24.312 V10.3.0 (Jun. 2011) Technical Specification 3rd Generation Partnership Project; Technical Specification Group Core Network and Terminals; Access Network Discovery and Selection Function (ANDSF) Management Object (MO) (Release 10).

3GPP TS 24.302 V10.4.0 (Jun. 2011) Technical Specification 3rd Generation Partnership Project; Technical Specification Group Core Network and Terminals; Access to the 3GPP Evolved Packet Core (EPC) via non-3GPP access networks; Stage 3 (Release 10).

3GPP TR 23.853 V0.2.0 (May 2011) Technical Report 3rd Generation Partnership Project; Technical Specification Group Services and System Aspects; Operator Policies for IP Interface Selection (OPIIS); (Release 11).

ETSI TS 123 402 V10.4.0 (Jun. 2011), Universal Mobile Telecommunications System (UMTS); LTE; Architecture enhancements for non-3GPP accesses (3GPP TS 23.402 version 10.4.0 Release 10), cover page, p. 1 and 13-48.

Office action mailed on May 8, 2014 for the Taiwan application No. 101124711, filing date: Jul. 9, 2012, p. 1-10.

Office action mailed on Aug. 1, 2014 for the China application No. 201210248745.0, filing date: Jul. 9, 2012.

* cited by examiner

METHOD OF HANDLING ACCESS NETWORK DISCOVERY AND SELECTION FUNCTION AND RELATED COMMUNICATION DEVICE

CROSS REFERENCE TO RELATED APPLICATIONS

This application claims the benefit of U.S. Provisional Application No. 61/505,529, filed on Jul. 7, 2011 and entitled "Method for the enhancement of ANDSF for IP flow mobility", the contents of which are incorporated herein in their entirety.

BACKGROUND OF THE INVENTION

1. Field of the Invention

The present invention relates to a method used in a wireless communication system and related communication device, and more particularly, to a method of handling an access network discovery and selection function and related communication device.

2. Description of the Prior Art

A long-term evolution (LTE) system supporting the 3GPP Rel-8 standard and/or the 3GPP Rel-9 standard are developed by the 3rd Generation Partnership Project (3GPP) as a successor of a universal mobile telecommunications system (UMTS), for further enhancing performance of the UMTS to satisfy increasing needs of users. The LTE system includes a new radio interface and a new radio network architecture that provides a high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple UEs, and communicates with a core network (e.g., evolved packet core (EPC) network) including a mobility management entity (MME), a serving gateway, etc., for Non Access Stratum (NAS) control.

Besides, a closed subscriber group (CSG) is defined in the 3GPP standards, for managing CSG cells (e.g., femto cells). In detail, each CSG cell is identified by a CSG identity, and multiple CSG cells may share a same CSG identity. The UE can determine whether it can access a CSG cell (e.g., communicate with the EPC network via the CSG cell) by checking a CSG identity of the CSG cell. Further, a CSG cell can be configured to operate in a CSG mode, to allow only a limited set of UEs to access the CSG cell. Alternatively, a CSG cell can be configured to operate in an open access mode, to allow all UEs to access the CSG cell.

An access network discovery and selection function (ANDSF) is a new network entity located (e.g., operated) in a home public land mobile network (PLMN) of a UE as a Home-ANDSF (H-ANDSF), or in a visited PLMN of the UE as a Visited-ANDSF (V-ANDSF). The ANDSF is used for providing assistance data of network discovery and selection according to operators' policy. The ANDSF shall respond to a request transmitted by a UE for accessing network discovery information (pull mode operation), or initiate data transfer to the UE (push mode operation), according to network triggers or a result of previous communications with the UE. In detail, an inter-system mobility policy (ISMP), provided by the ANDSF, is used for describing operator-defined rules and preferences that may affect inter-system mobility decisions taken by the UE. For example, when the UE intends to route IP traffic only over a single radio interface, the inter-system mobility policy can be considered, to decide when inter-system mobility is allowed (or restricted) and/or to select an access technology type and/or an access network which is the most preferable. On the other hand, an inter-system routing policy (ISRP), provided by the ANDSF, is used for describing inter-system routing policies according to which the UE can route IP traffic over multiple radio interfaces simultaneously. For example, the UE can decide whether an access technology type and/or access network is restricted to a specific IP traffic flow and/or a specific APN. The UE may also select an access technology type and/or an access network which is the most preferable.

Therefore, the ANDSF can provide ISMP policies to a UE, for assisting the UE to perform network discovery and selection according to operators' policies. Further, the ANDSF provides the ISMP policies for a preferred access technology to the UE under that validityArea provides location information including PLMN, LAC, TAC, GERAN_CI, UTRAN_CI, EUTRA_CI, etc. For example, when the UE is a specific CSG member and located in coverage of a marco EUTRA cell and a group of CSG cells with a specific CSG identity, the ANDSF can only provide routing policies in favor of a PrioritizedAccess between a 3GPP access technology and non-3GPP access technologies (e.g., WLAN with a SSID) or between cells in the 3GPP access technology under that the ValidityArea provides a specific cell identity.

However, a home access network scenario is not considered in the prior art. In detail, if the UE enters coverage of a group of CSG cells with the same CSG ID, the ANDSF can only provide a list of routing policies with ValidityArea configured to each cell ID. The routing policies are valid only when the UE is using a cell with a cell ID specified in the validityArea. Handling of the routing policies is complicated and is not necessary. Further, the UE may be in coverage of multiple CSG cells with different CSG IDs, wherein some of the CSG cells may have different capabilities. The ANDSF does not allow an operator to provide a routing policy with a preferred access technology configured as the 3GPP access technology with a specific CSG ID.

On the other hand, when the UE is handed over from a Marco cell to a CSG cell, an existing packet data network (PDN) connection of the UE remains connecting to a PDN gateway (P-GW) in an EPC network via a home eNB according to the prior art. If a home network equips with a local gateway (L-GW), the ANDSF lacks an applicable leaf for providing offloading policies to the UE, so as to route PDN connections of the UE from the P-GW in the EPC network to the L-GW in the home network.

Besides, according to the prior art, an operator uses ISRP to influence a UE to select between a 3GPP access technology and non-seamless (NS) WLAN offload, for routing a specific PDN connection associated to a specific APN) according to multi access PDN connectivity (MAPCON) polices or NS-WLAN offload policies, or routing specific IP flows according to IP Flow Mobility and Seamless Offload (IFOM) policies.

However, when the UE has multiple PDN connections, the ANDSF lacks applicable leafs for providing offloading policies to the UE, for the UE to select a specific IP interface identified by associated APN for routing specific IP flows. For example, the UE has multiple PDN connections via the same access network to the EPC network (e.g., PDN1 associated with APN1 for evolved packet system (EPS) services and PDN2 associated with APN2 for IP multimedia subsystem (IMS) services) or the home network (e.g., PDN1 associated with APN1 via the EPC network and PDN2 associated to APN2 via the L-GW in the home Network). Based on the current ISRP policies, there is no routing policy according to which the UE can route a specific PDN connection or a specific IP flow in the above scenarios.

Therefore, how to solve abovementioned problems is a topic to be discussed and addressed.

SUMMARY OF THE INVENTION

The present invention therefore provides a method and related communication device for handling an access network discovery and selection function to solve the abovementioned problem.

A method of handling an access network discovery and selection function (ANDSF) for a network of a wireless communication system is disclosed. The method comprises determining a first plurality of closed subscriber group (CSG) cells of the wireless communication system with a first CSG identity, for a mobile device of the wireless communication system to communicate with an evolved packet core (EPC) network of the wireless communication system via the first plurality of CSG cells, after the network determines the 3rd Generation Partnership Project (3GPP) as an access technology for the mobile device; and configuring an inter-system mobility policy (ISMP) node such that a value of an AccessTechnology leaf of a PrioritizedAccess node is configured as the 3GPP, and a value of a first AccessId leaf of the PrioritizedAccess node is configured as the first CSG identity of the first plurality of CSG cells.

A method of handling an access network discovery and selection function (ANDSF) for a network of a wireless communication system is disclosed. The method comprises determining a plurality of closed subscriber group (CSG) cells of the wireless communication system with a CSG identity, for the a mobile device of the wireless communication system to access a first service indicated by a first access point name (APN) of the wireless communication system via the plurality of CSG cells with the CSG identity, after the network determines the 3GPP as an access technology for the mobile device; and configuring an inter-system mobility policy (ISMP) node such that a value of an AccessTechnology leaf of a PrioritizedAccess node is configured as the 3rd Generation Partnership Project (3GPP), a value of an AccessId leaf of the PrioritizedAccess node is configured as the CSG identity of the plurality of CSG cells, and a PrioritizedAPN node is configured under the ISMP node for configuring the first APN.

A method of handling an access network discovery and selection function (ANDSF) for a network of a wireless communication system is disclosed. The method comprises determining an IP flow of a mobile device of the wireless communication system, which is with a packet data network (PDN) connection associated to an access point name (APN) of the wireless communication system, for the mobile device to route the IP flow; and configuring an inter-system routing policy (ISRP) policy for a ForFlowBased node such that a value of an AccessTechnology leaf of a RoutingRule node is configured as the 3rd Generation Partnership Project (3GPP), a value of an AccessId leaf is configured as a CSG identity of a plurality of CSG cells, and a PrioritizedAPN node is configured under a policy node for configuring the APN.

A method of handling an access network discovery and selection function (ANDSF) for a mobile device in a wireless communication system is disclosed. The method comprises receiving at least one policy from a network of the wireless communication system; checking a RoutingCriteria node for location of the UE, for determining a validity criteria of a policy according to an AccessTechnology node of a RoutingRule node, to select at least one valid policy from the at least one policy; and selecting one of the at least one valid policy, for communicating with the network.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
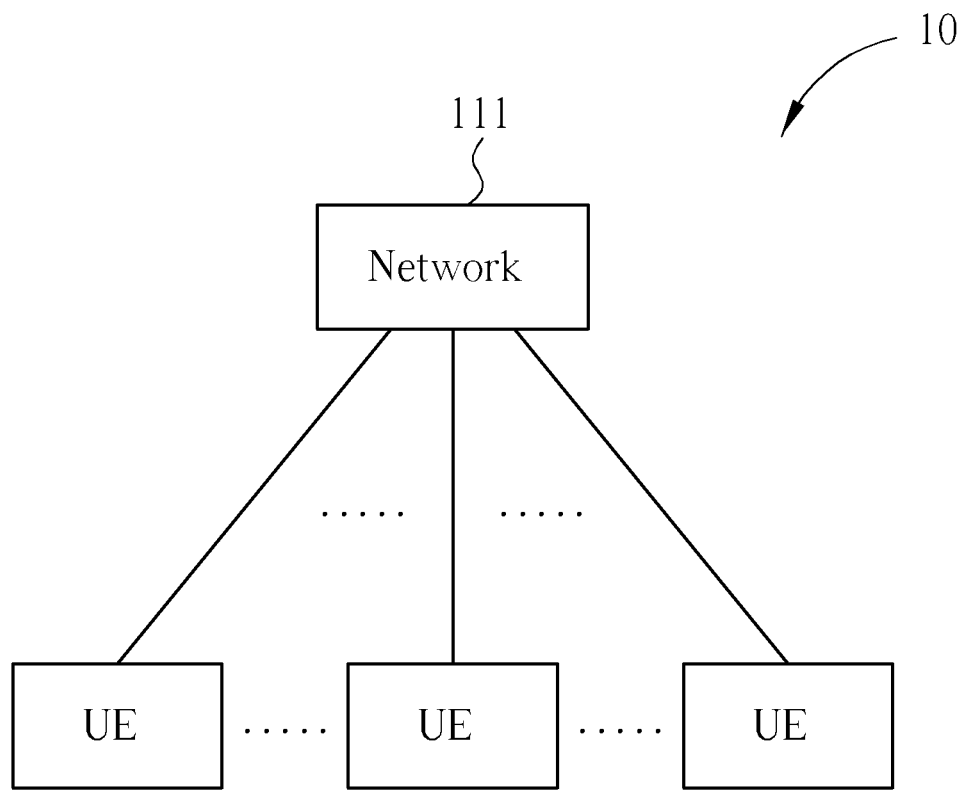
FIG. 1 is a schematic diagram of a wireless communication system according to an example of the present invention.

Please refer to FIG. 1, which is a schematic diagram of a wireless communication system 10 according to an example of the present invention. The wireless communication system 10 is briefly composed of a network 111 and a plurality of user equipments (UEs). In FIG. 1, the network 111 and the UEs are simply utilized for illustrating the structure of the wireless communication system 10. Practically, the network 111 can be a universal terrestrial radio access network (UTRAN) comprising a plurality of Node-Bs (NBs) in a universal mobile telecommunications system (UMTS). Alternatively, the network 111 can be an evolved UTRAN (E-UTRAN) comprising a plurality of evolved NBs (eNBs) and/or relays in a long term evolution (LTE) system or a LTE-Advanced (LTE-A) system. The UTRAN/EUTRAN can be used for building macrocells, picocells or femtocells, to cover geographic areas with various sizes. Alternatively, the network 111 can be a wireless local area network (WLAN) (e.g., WiFi) comprising one or more access points (APs).

Furthermore, the network 111 can also include both the UTRAN/E-UTRAN and a core network (e.g., an evolved packet core (EPC) network), wherein the core network includes network entities such as a Mobility Management Entity (MME), a Serving Gateway (S-GW), a Packet Data Network (PDN) Gateway (P-GW), and/or a local gateway (L-GW). In other words, after the network 111 receives information transmitted by a UE, the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. Besides, the information can be processed by both the UTRAN/E-UTRAN and the core network, and the decisions are made after coordination and/or cooperation are performed by the UTRAN/E-UTRAN and the core network. The network 111 is capable of executing an access network discovery and selection function (ANDSF), for providing assistance data of network discovery and selection according to operators' policy. That is, the ANDSF can be realized by a dedicated ANDSF server in the network 111, or can be realized as a function in a network entity such as the NB, the eNB and/or the relay node in the network 111. Thus, when it is stated that a following example is realized by the network 111, it means that the following example is realized by the dedicated ANDSF server and/or the network entity in the network 111.

Figure 2:
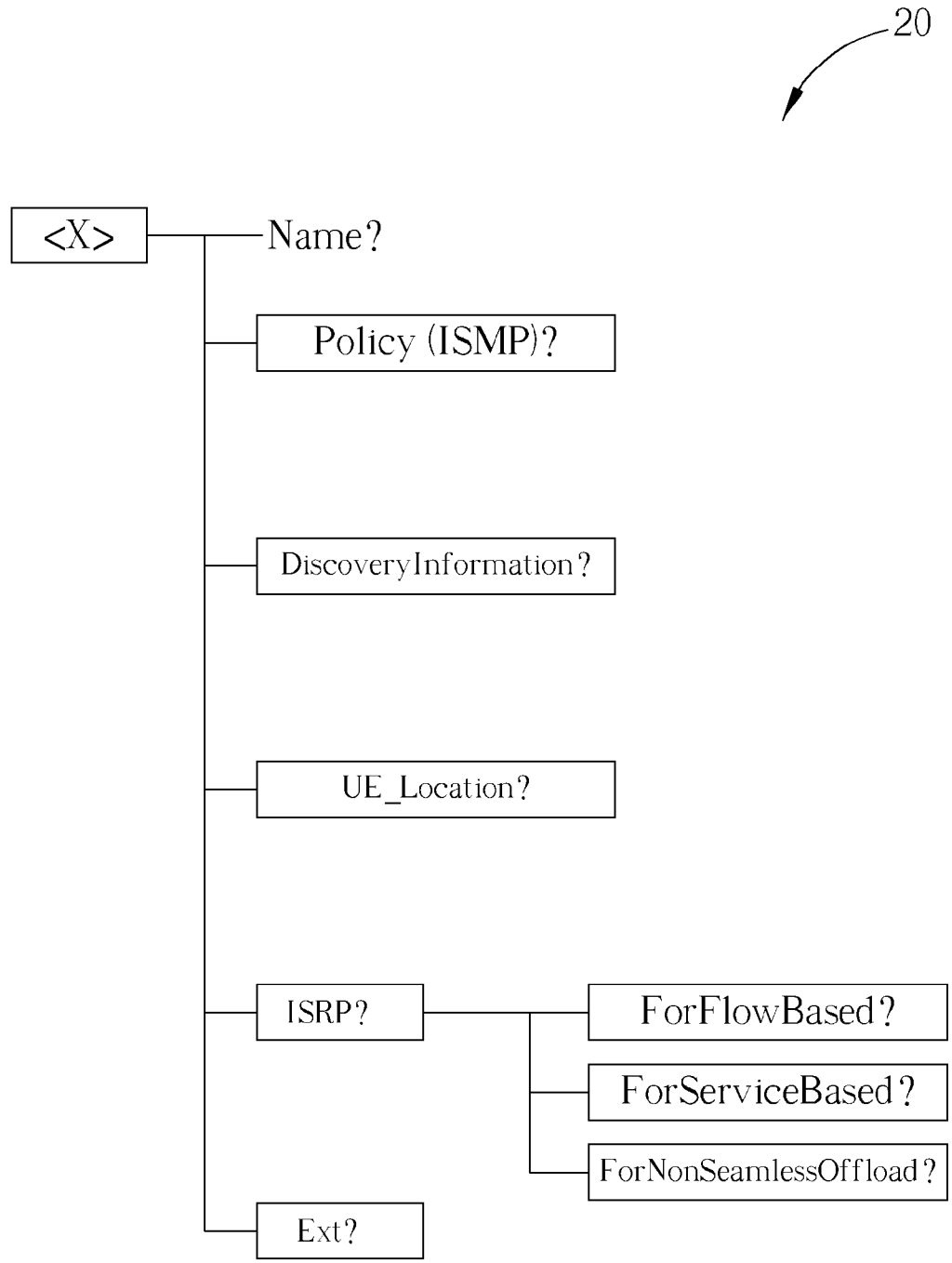
FIG. 2 is a schematic diagram of an ANDSF according to an example of the present invention.

Please refer to FIG. 2, which is a schematic diagram of an ANDSF 20 according to an example of the present invention. The ANDSF 20 can include possible nodes and leaves such as a policy node, a DiscoveryInformation node, a UE_Location node and an inter-system routing policy (ISRP) node. Further, the policy node can be referred to as an inter-system mobility policy (ISMP) node and the ISRP node which can be a parent node accommodating one or more policy nodes such as a ForFlowBased node, a ForServiceBased node and a ForNonSeamlessOffload node. In short, the ISMP node, the ForFlowBased node, the ForServiceBased node and the ForNonSeamlessOffload node are all policy nodes which contain policies, e.g. routing information, for the UE to determine which access technology to use, e.g., based on policies in the ISMP node, or how to distribute traffic among available accesses, e.g. based on policies in the ForFlowBased node, the ForServiceBased node or the ForNonSeamlessOffload node. The ANDSF 20 is simply used for illustrating possible realizations of the ANDSF, and may include additional nodes and leaves which are not limited herein.

The UEs can be mobile phones, laptops, tablet computers, electronic books, and portable computer systems. The UEs can also be referred to mobile stations (MSs) or user equipments (UEs) in the UMTS, the LTE system or the LTE-A system. Besides, the network 111 and a UE can be seen as a transmitter or a receiver according to transmission direction, e.g., for an uplink (UL), the UE is the transmitter and the network 111 is the receiver, and for a downlink (DL), the network 111 is the transmitter and the UE is the receiver.

Figure 3:
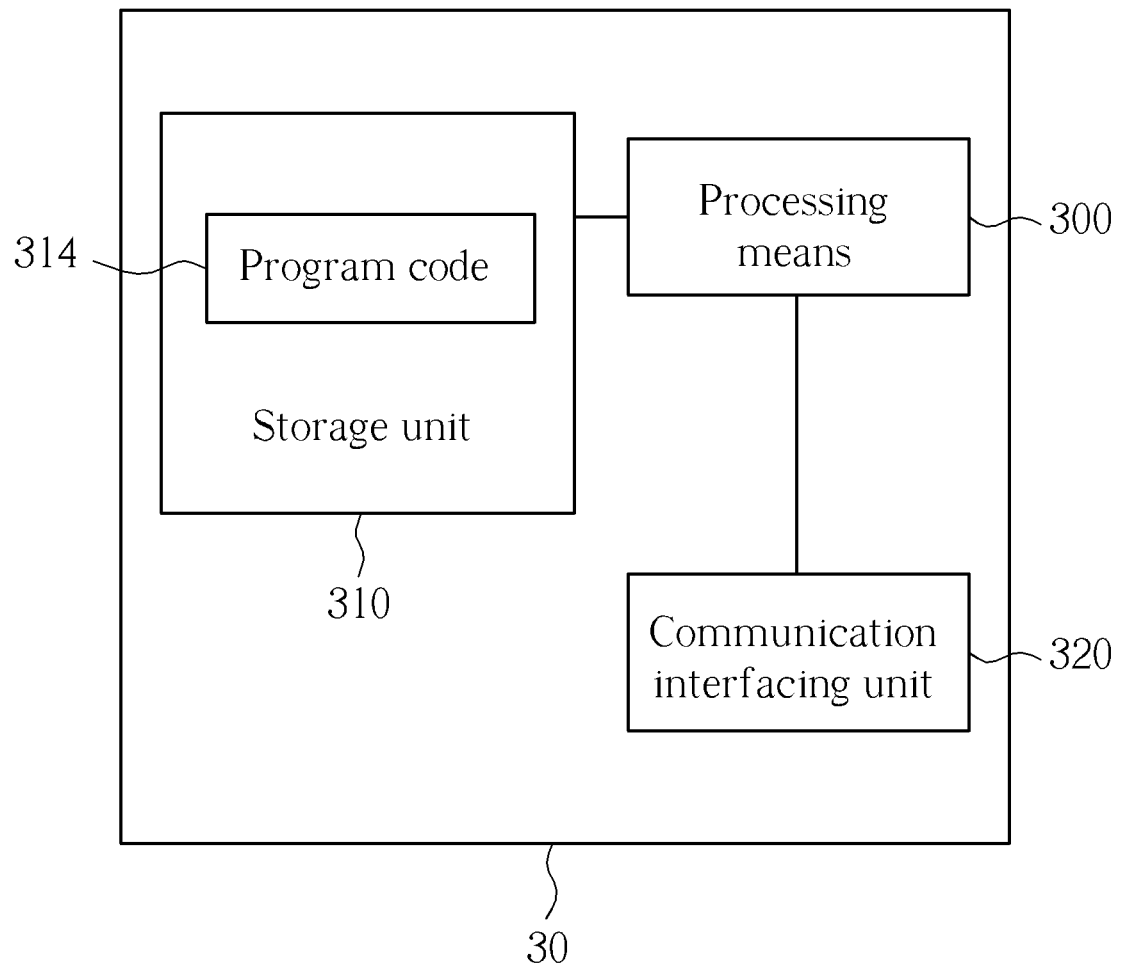
FIG. 3 is a schematic diagram of a communication device according to an example of the present invention.

Please refer to FIG. 3, which is a schematic diagram of a communication device 30 according to an example of the present invention. The communication device 30 can be a UE or the network 111 shown in FIG. 1, but is not limited herein. The communication device 30 may include a processing means 300 such as a microprocessor or Application Specific Integrated Circuit (ASIC), a storage unit 310 and a communication interfacing unit 320. The storage unit 310 may be any data storage device that can store a program code 314, accessed and executed by the processing means 300. Examples of the storage unit 310 include but are not limited to a subscriber identity module (SIM), read-only memory (ROM), flash memory, random-access memory (RAM), CD-ROM/DVD-ROM, magnetic tape, hard disk and optical data storage device. The communication interfacing unit 320 is preferably a transceiver and is used to transmit and receive signals according to processing results of the processing means 300.

Figure 4:
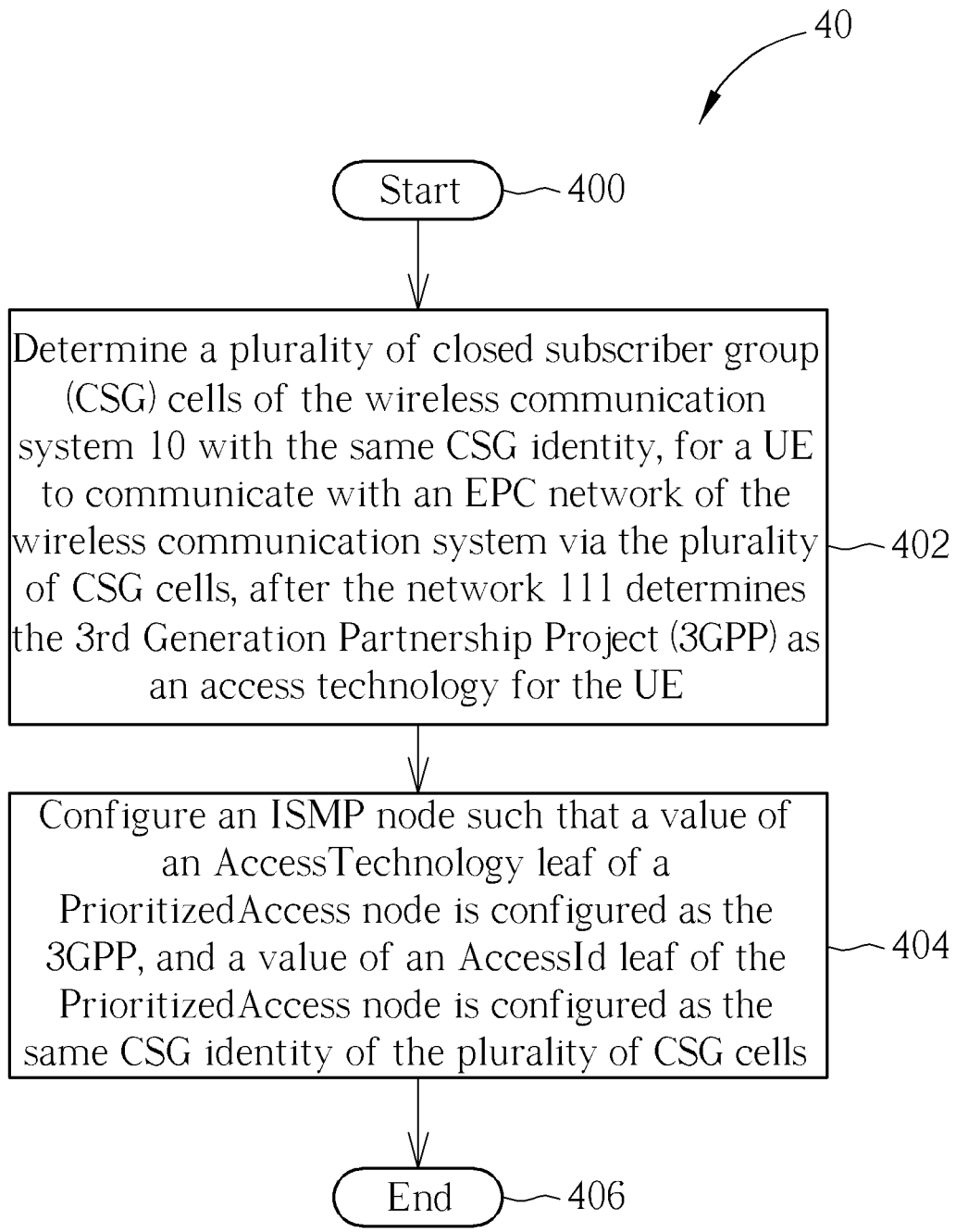
FIG. 4 is a flowchart of a process according to an example of the present invention.

Please refer to FIG. 4, which is a flowchart of a process 40 according to an example of the present invention. The process 40 is utilized in the network 111 (i.e., the ANDSF server therein) shown in FIG. 1, for handling the ANDSF 20 shown in FIG. 2. The process 40 may be compiled into the program code 314 and includes the following steps:

Step 400: Start.

Step 402: Determine a plurality of closed subscriber group (CSG) cells of the wireless communication system 10 with the same CSG identity, for a UE to communicate with an EPC network of the wireless communication system via the plurality of CSG cells, after the network 111 determines the 3rd Generation Partnership Project (3GPP) as an access technology for the UE.

Step 404: Configure an ISMP node such that a value of an AccessTechnology leaf of a PrioritizedAccess node is configured as the 3GPP, and a value of an AccessId leaf of the PrioritizedAccess node is configured as the same CSG identity of the plurality of CSG cells.

Step 406: End.

According to the process 40, the network 111 first determines a plurality of CSG cells of the wireless communication system 10 with the same CSG identity, for a UE to communicate with an EPC network of the wireless communication system via the plurality of CSG cells, after the network determines the 3GPP as an access technology for the UE. Then, the network 111 configures an ISMP node such that a value of an AccessTechnology leaf of a PrioritizedAccess node is configured as the 3GPP, and a value of an AccessId leaf of the PrioritizedAccess node is configured as the same CSG identity of the plurality of CSG cells. In other words, after the CSG identity is determined by the network 111, the 3GPP and the CSG identity of the CSG cells are configured (i.e., specified) in the ISMP node. Thus, according to the process 40, when the network 111 determines the 3GPP as an access technology for the UE, the network 111 can configure a CSG identity, to indicate the CSG cells with the CSG identity to the UE. As a result, the UE can communicate with the EPC network via the CSG cells.

For example, assuming that a CSG identity of a plurality of CSG cells is CSG-ID1, according to the process 40, an xml code for the ISMP node can be configured by the network 111 as follows:

<X>/Policy/<X>/PrioritizedAccess/<X>/AccessTechnology: 3GPP
<X>/Policy/<X>/PrioritizedAccess/<X>/AccessId: CSG-ID1

Figure 5:
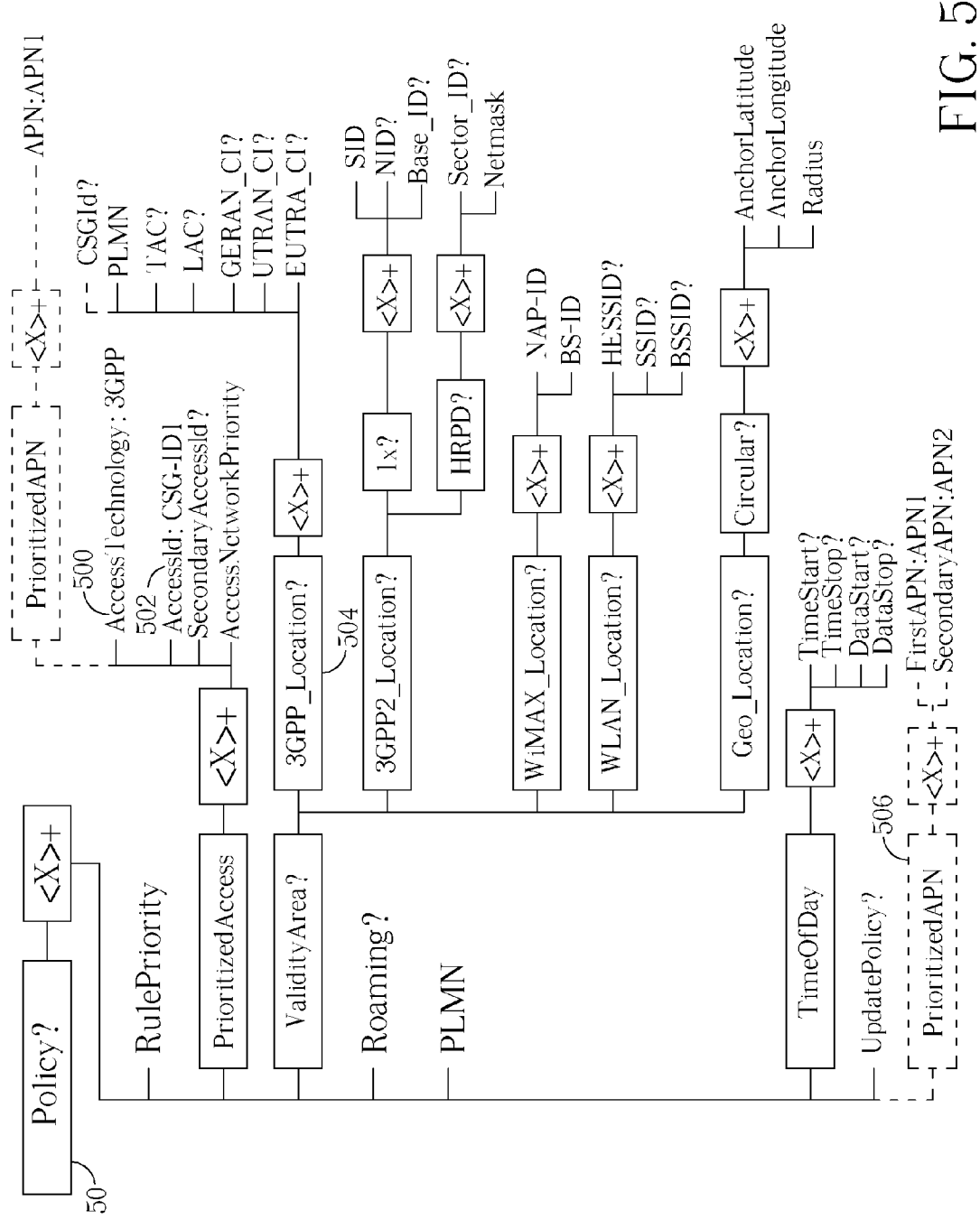
FIG. 5 is a schematic diagram of a policy node according to an example of the present invention.

Please refer to FIG. 5, which is a schematic diagram of a policy node 50 according to an example of the present invention. FIG. 5 is used for illustrating configuration (e.g., modification and addition) of nodes and leaves corresponding to the xml code. As shown in FIG. 5, the AccessTechnology leaf 500 and the AccessId leaf 502 are configured (i.e., specified) as the 3GPP and the CSG-ID1, respectively.

Please note that, a spirit of the process 40 is that when the network 111 determines the 3GPP as an access technology for the UE, the network configures a CSG identity, to indicate the CSG identity to the UE which may be the member of the CSG with the CSG identity, such that the UE can communicate with the EPC network via CSG cells with the CSG identity. Realization of the process 40 is not limited. For example, policies of the PrioritizedAccess node, which includes the AccessTechnology leaf configured as the 3GPP and the AccessId leaf configured as the CSG identity, can be provided by the policy node, e.g., the ISMP node, the ForFlowBased node, the ForServiceBased node and the ForNonSeamlessOffload node, as shown in FIG. 2.

Please note that, even though the policy node is used in the following examples for illustrating the present invention, the policy node can be replaced by the other policy nodes including the ForFlowBased node, the ForServiceBased node or the ForNonSeamlessOffload node, i.e., the following examples can be applied to the ForFlowBased node, the ForServiceBased node and the ForNonSeamlessOffload node.

For example, the network 111 can configure a policy node under the ISRP node, e.g., a ForFlowBased node with a RoutingRule node with an AccessTechnology leaf configured as the 3GPP and an AccessId leaf configured as a CSG identity, e.g., CSG-ID1. That is, according to the process 40, an xml code for the ISRP node can be configured by the network 111 as follows:

```
<X>/ISRP/<X>/ForFlowBased/<X>/RoutingRule/<X>/AccessTechnology:
3GPP
<X>/ISRP/<X>/ForFlowBased/<X>/RoutingRule/<X>/AccessId:
CSG-ID1
```

Besides, the network 111 can configure a policy node under the ISRP node for, e.g., a ForServiceBased node with a RoutingRule node with an AccessTechnology leaf configured as the 3GPP, and an AccessId leaf configured as a CSG identity, e.g., CSG-ID1. That is, according to the process 40, an xml code for the ISRP node can be configured by the network 111 as follows:

```
<X>/ISRP/<X>/ForServiceBased/<X>/RoutingRule/<X>/AccessTechnology: 3GPP
<X>/ISRP/<X>/ForServiceBased/<X>/RoutingRule/<X>/AccessId:
CSG-ID1
```

On the other hand, two leaves, a HomeAccessID leaf and a SecondaryHomeAccessID leaf, can be newly added under the PrioritizedAccess node to avoid a situation that that the original AccessId leaf cannot be used due to format inconsistency. When the AccessTechnology leaf is configured as the 3GPP, the HomeAccessID leaf and the SecondaryHomeAccessID leaf can be configured as two CSG identities, respectively, e.g., CSG-ID1 and CSG-ID2. That is, an xml code for the ISMP node can be configured by the network 111 as follows:

```
<X>/Policy/<X>/PrioritizedAccess/<X>/AccessTechnology: 3GPP
<X>/Policy/<X>/PrioritizedAccess/<X>/HomeAccessId: CSG-ID1
<X>/Policy/<X>/PrioritizedAccess/<X>/SecondaryHomeAccessId:
CSG-ID2
```

Please note that the CSG identities CSG-ID1 and CSG-ID2, which are the values of the HomeAccessId leaf and the SecondaryHomeAccessId leaf, respectively, are presented as an example to demonstrate specific CSG identities of the CSG cells. In other words, according to such policies, the UE which may be a member of the CSGs with the CSG identities CSG-ID1 and/or CSG-ID2 can choose and access the CSG cells with the CSG identities CSG-ID1 and/or CSG-ID2 when using the 3GPP as the access technology. For example, if the UE is the member of the CSG with the CSG identity CSG-ID2 but not the member of the CSG with the CSG identity CSG-ID1, it can choose and access one CSG cell with the CSG identity CSG-ID2. Please note that, when configuring a policy (i.e., a policy node) with a specific CSG identity for the UE, the network 111 can decide if the CSG membership of the UE should be considered. The UE can determine the validity of the policies based on its membership of a specific CSG with a CSG identity.

Figure 6:
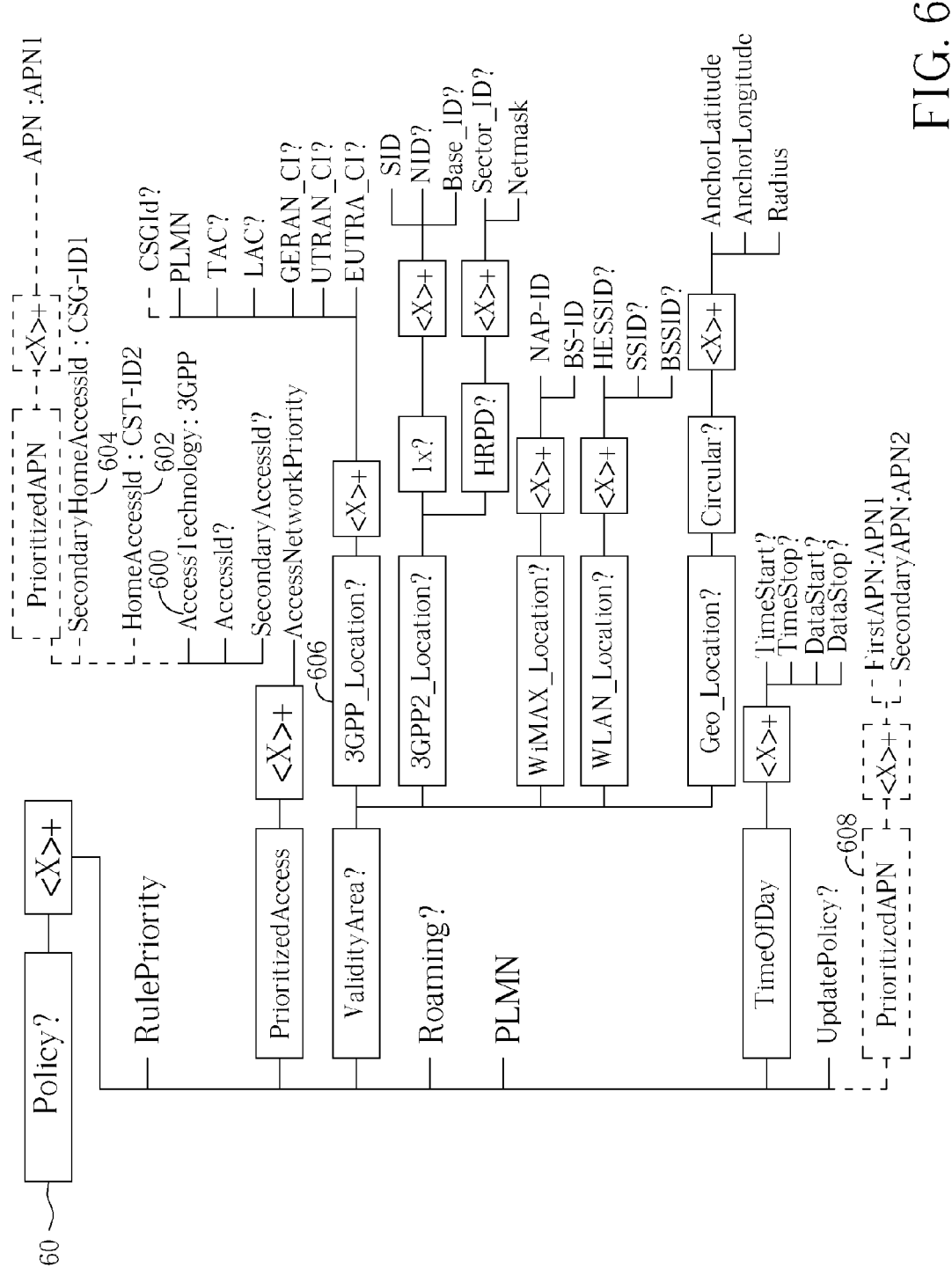
FIG. 6 is a schematic diagram of a policy node according to an example of the present invention.

Please refer to FIG. 6, which is a schematic diagram of a policy node 60 according to an example of the present invention. FIG. 6 is used for illustrating configuration (e.g., modification and addition) of nodes and leaves corresponding to the xml code. As shown in FIG. 6, the AccessTechnology leaf 600, the HomeAccessID leaf 602 and the SecondaryHomeAccessID leaf 604 are configured (i.e., specified) as the 3GPP, CSG-ID1, and CSG-ID2, respectively.

Besides, the network 111 can also configure a new leaf CSGId under a 3GPP_Location node of a ValidityArea node for the ISMP node, for configuring a CSG identity. That is, an xml code for the ISMP node can be configured by the network 111 as follows:

```
<X>/Policy/<X>/ValidityArea/3GPP_Location/<X>/CSGId?
```

As shown in FIG. 5, the leaf CSGId can be configured under the 3GPP_Location node 504. Similarly, the leaf CSGId is configured under the 3GPP_Location node 606 in FIG. 6.

On the other hand, the network 111 can further provide discovery information for the UE by configuring a new leaf CSGId under a 3GPP_Location node of an AccessNetworkArea node for a DiscoveryInformation node, for configuring a CSG identity. That is, an xml code for the DiscoveryInformation node can be configured by the network 111 as follows:

```
<X>/DiscoveryInformation/<X>/AccessNetworkArea/3GPP_Location/<X>/CSGId?
```

Figure 7:
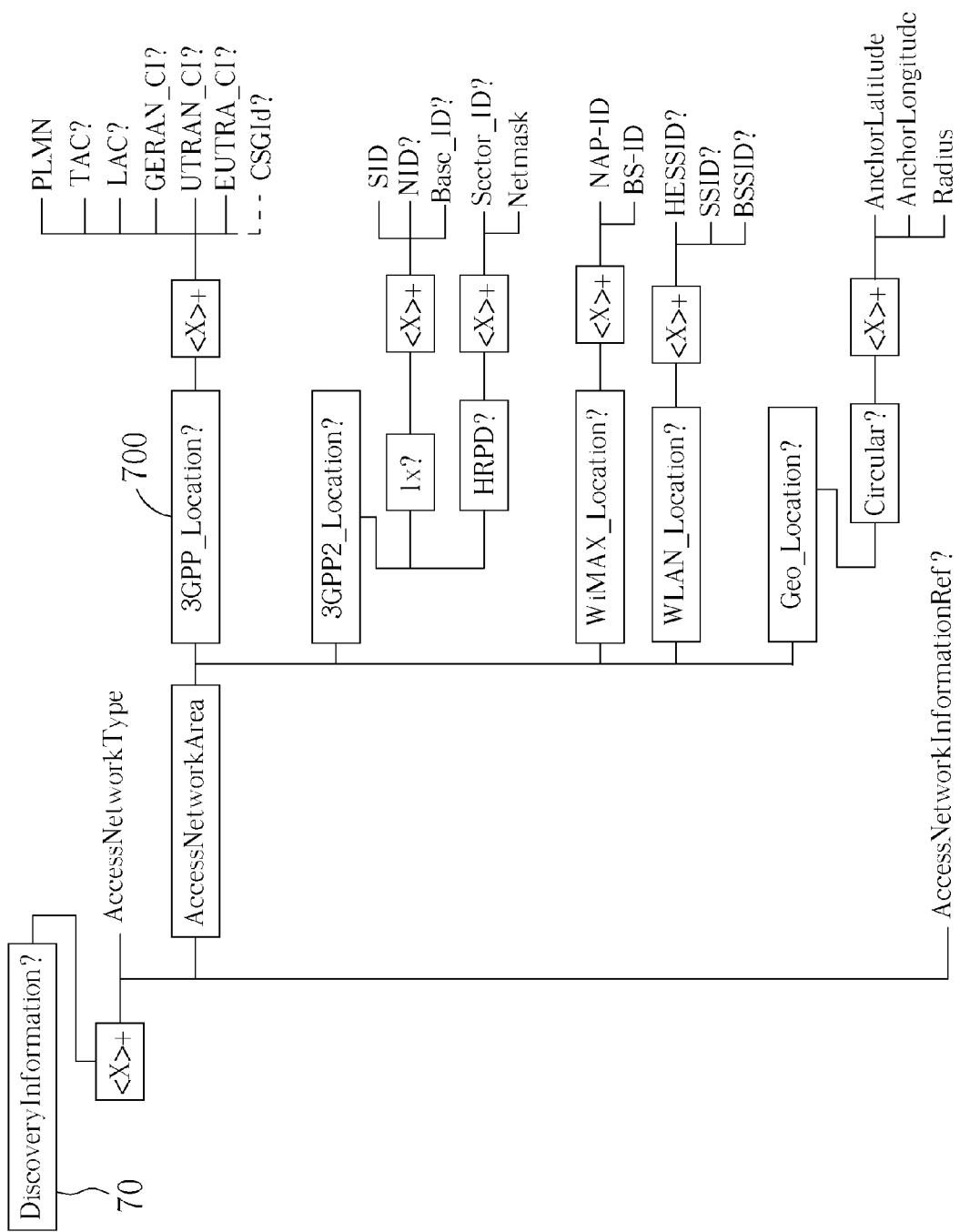
FIG. 7 is a schematic diagram of a DiscoveryInformation node according to an example of the present invention.

Please refer to FIG. 7, which is a schematic diagram of a DiscoveryInformation node 70 according to an example of the present invention. FIG. 7 is used for illustrating configuration (e.g., modification and addition) of nodes and leaves corresponding to the xml code. As shown in FIG. 7, the CSGId leaf is configured under the 3GPP_Location node 700. Thus, the UE can discover the CSG cells (e.g., femtocells in a home access network) with the specified CSG identity according to the newly added leaf CSGId.

Besides, the network 111 can provide location information of a UE to the UE by configuring a new leaf CSGId under a 3GPP_Location node for a UE_Location node, for configuring a CSG identity. That is, an xml code for the UE_Location node can be configured by the network 111 as follows:

```
<X>/UE_Location/3GPP_Location/<X>/CSGId?
```

Figure 8:
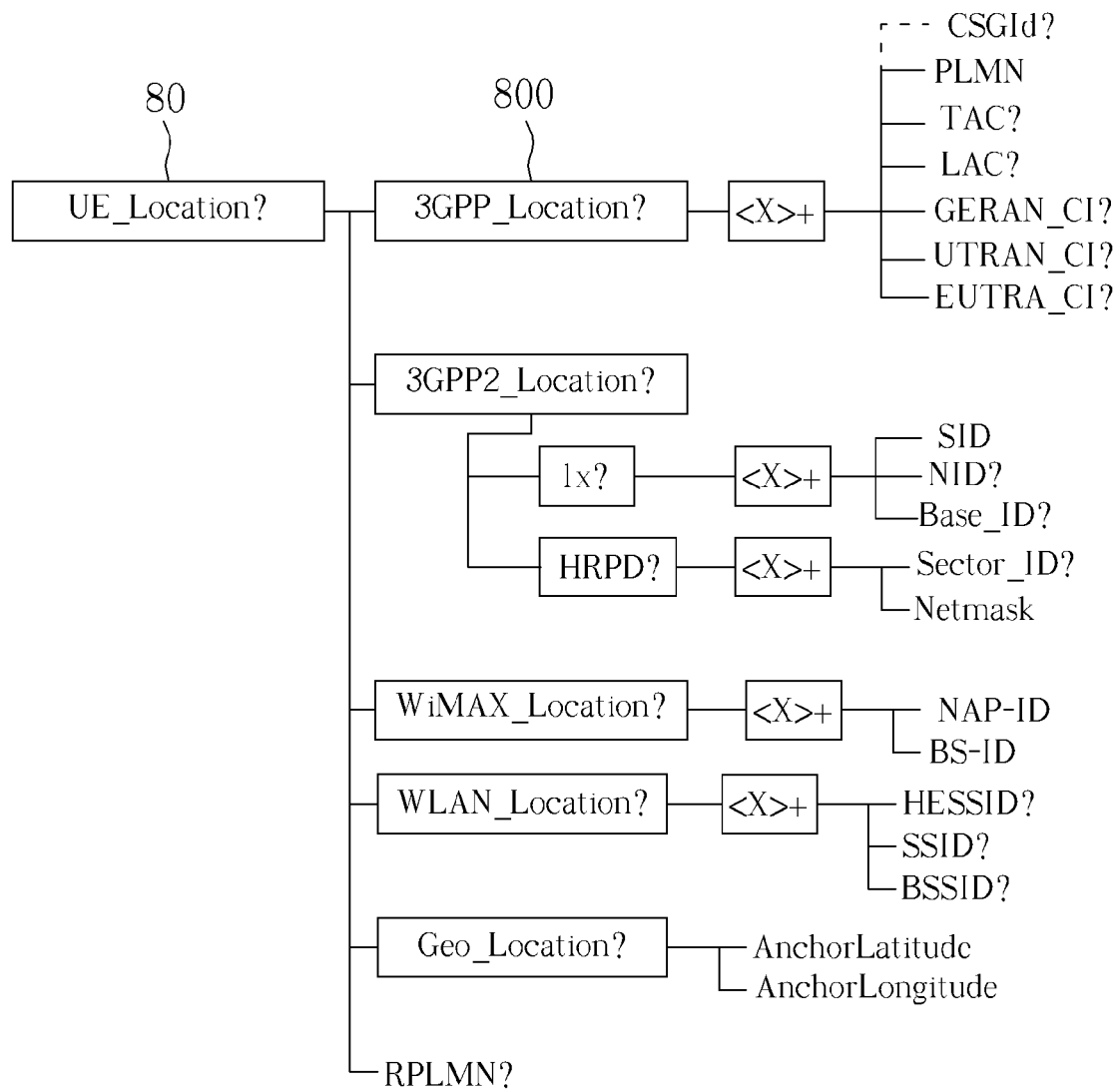
FIG. 8 is a schematic diagram of a UE_Location node according to an example of the present invention.

Please refer to FIG. 8, which is a schematic diagram of a UE_Location node 80 according to an example of the present invention. FIG. 8 is used for illustrating configuration (e.g., modification and addition) of nodes and leaves corresponding to the xml code. As shown in FIG. 8, the leaf CSGId is configured under the 3GPP_Location node 800. Thus, the network 111 can provide the location information of the UE in terms of a specific value of the CSGId, i.e., a CSG identity, which indicates the UE that it locates in coverage of CSG cells with the CSG identity.

Figure 9:
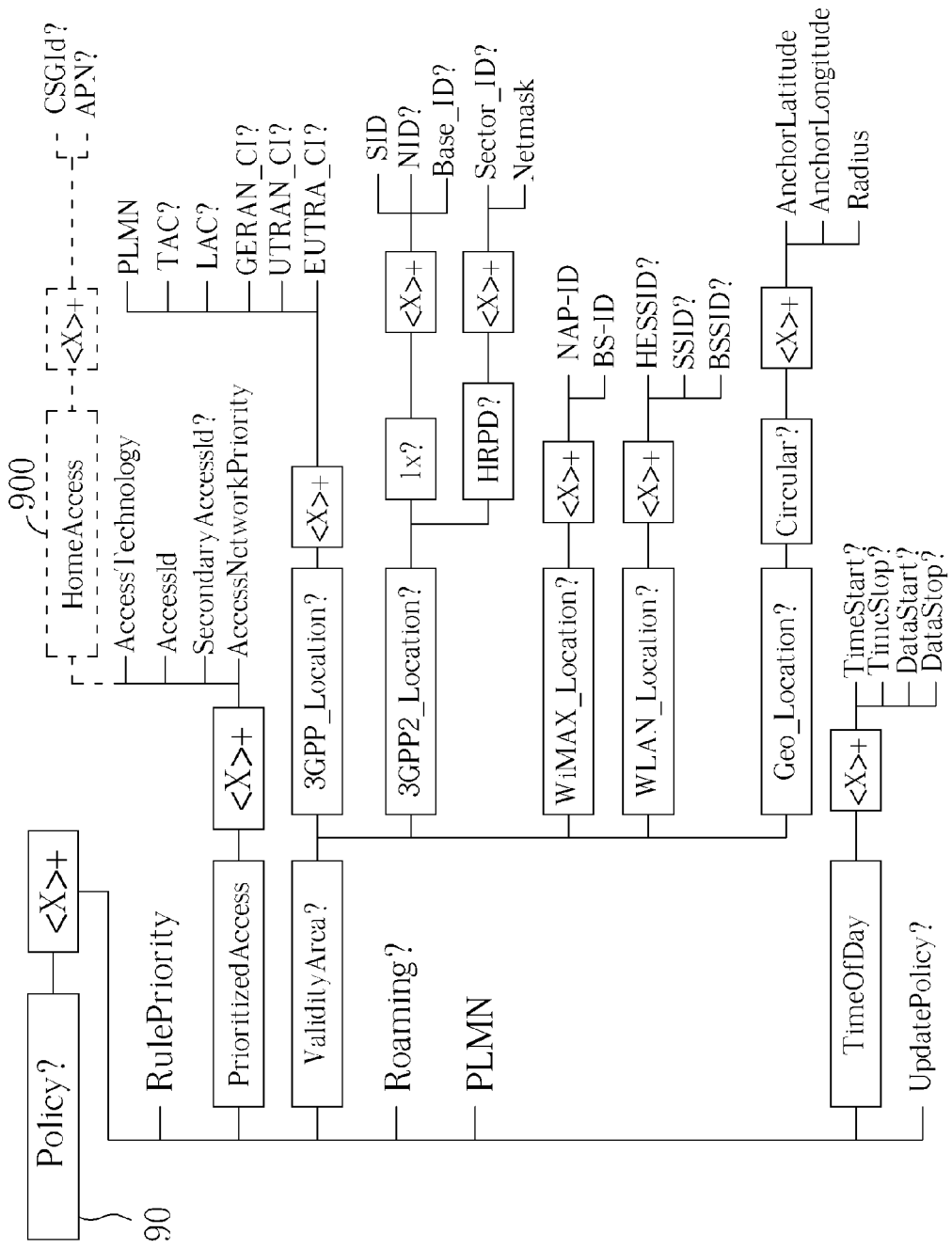
FIG. 9 is a schematic diagram of a policy node according to an example of the present invention.

On the other hand, a CSG identity may also be configured under a node which is newly added under the PrioritizedAccess node. For example, please refer to FIG. 9, which is a schematic diagram of a policy node 90 according to an example of the present invention. FIG. 9 is used for illustrating configuration (e.g., modification and addition) of nodes and leaves. As shown in FIG. 9, the HomeAccess node 900 is newly added for configuring a new leaf CSGId.

Note that a criterion according to which the network 111 determines a plurality of CSG cells with a specific CSG identity for the UE is not limited. For example, the CSG cells that the UE can access can be determined according to whether the UE is a member of the CSG with the CSG identity, UE's subscription or an operator configuration of the wireless communication system.

Thus, according to the process 40 and the above description, when the network 111 determines the 3GPP as an access technology for the UE, the network 111 can configure a policy (i.e., a policy node) with the 3GPP and a CSG identity of a plurality of CSG cells, to indicate the policy to the UE. As a result, the UE can communicate with the EPC network via one or more of the CSG cells with the CSG identity. When the UE moves around and handover between CSG cells, it does not need to re-evaluate policies for finding a better policy for accessing the network 111.

Figure 10:
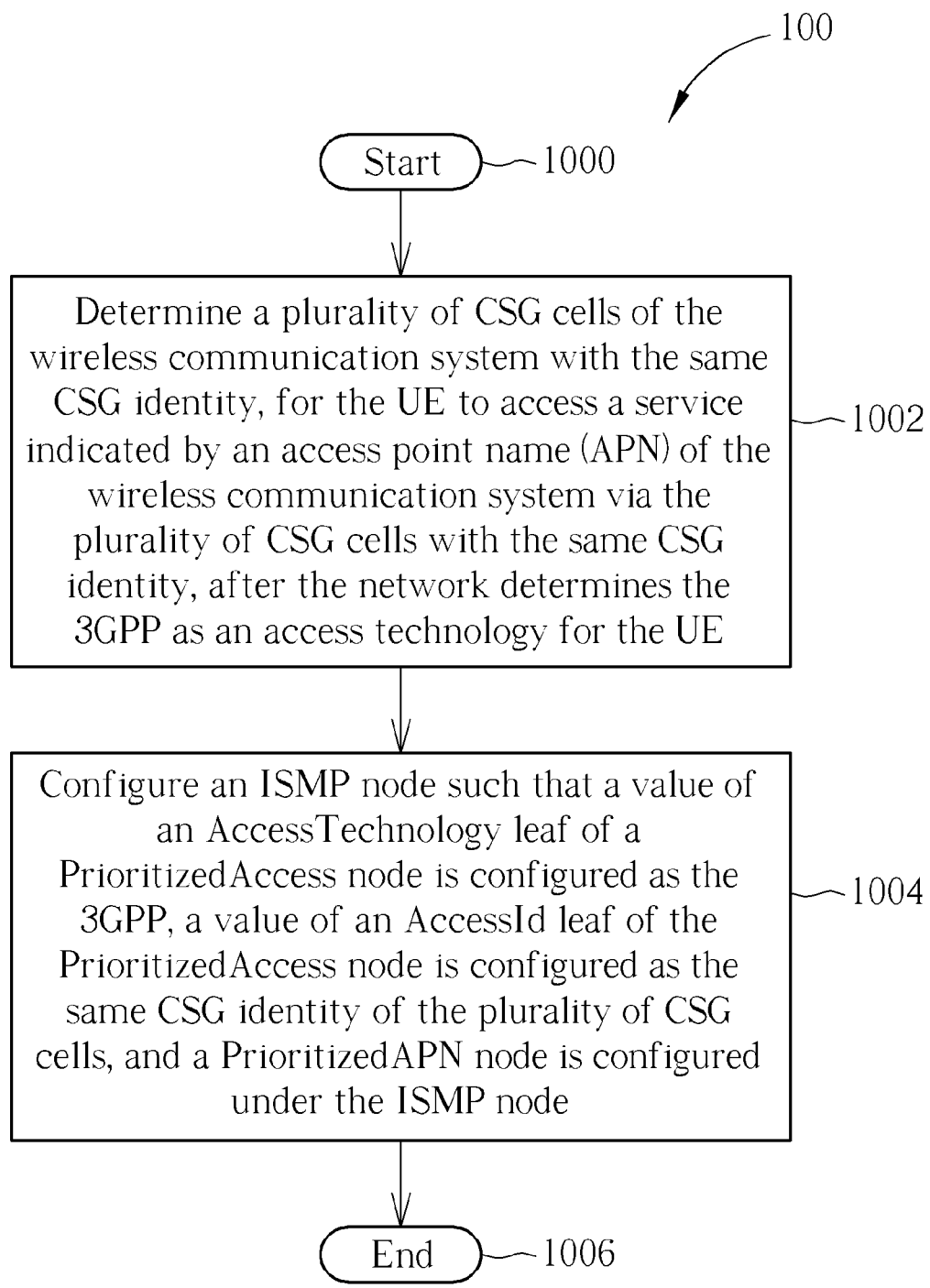
FIG. 10 is a flowchart of a process according to an example of the present invention.

Please refer to FIG. 10, which is a flowchart of a process 100 according to an example of the present invention. The process 100 is utilized in the network 111 (i.e., the ANDSF server therein) shown in FIG. 1, for handling the ANDSF shown in FIG. 2, to provide routing policies to a UE, for the UE to get a 3GPP access via a CSG cell with a specific CSG identity and to have an L-GW providing a PDN connection via a specific APN. The process 100 may be compiled into the program code 314 and includes the following steps:

Step 1000: Start.

Step 1002: Determine a plurality of CSG cells of the wireless communication system with the same CSG identity, for the UE to access a service indicated by an access point name (APN) of the wireless communication system via the plurality of CSG cells with the same CSG identity, after the network 111 determines the 3GPP as an access technology for the UE.

Step 1004: Configure an ISMP node such that a value of an AccessTechnology leaf of a PrioritizedAccess node is configured as the 3GPP, a value of an AccessId leaf of the PrioritizedAccess node is configured as the same CSG identity of the plurality of CSG cells, and a PrioritizedAPN node is configured under the ISMP node.

Step 1006: End.

According to the process 100, the network 111 first determines a plurality of CSG cells of the wireless communication system with the same CSG identity, for the UE to access a service indicated by an APN of the wireless communication system via the plurality of CSG cells with the same CSG identity, after the network determines the 3GPP as an access technology for the UE. Then, the network 111 configures an ISMP node such that a value of an AccessTechnology leaf of a PrioritizedAccess node is configured as the 3GPP, a value of an AccessId leaf of the PrioritizedAccess node is configured as the same CSG identity of the plurality of CSG cells, and a PrioritizedAPN node is configured under the ISMP node. That is, assuming that the value of the AccessId leaf is CSG-ID1 and an APN APN1 is configured under the PrioritizedAPN node, an xml code for the policy node can be configured by the network 111 as follows:

```
<X>/Policy/<X>/PrioritizedAccess/<X>/AccessTechnology: 3GPP
<X>/Policy/<X>/PrioritizedAccess/<X>/AccessId: CSG-ID1
<X>/Policy/<X>/PrioritizedAPN/<X>/
<X>/Policy/<X>/PrioritizedAPN/<X>/APN: APN1
```

Please note that, a PrioritizedAPN node can also be newly added under the PrioritizedAccess node for configuring the APN APN1 as follows:

```
<X>/Policy/<X>/PrioritizedAccess/<X>/AccessTechnology: 3GPP
<X>/Policy/<X>/PrioritizedAccess/<X>/AccessId: CSG-ID1
<X>/Policy/<X>/PrioritizedAccess/<X>/PrioritizedAPN: APN1
```

Furthermore, more leafs, e.g., a FirstAPN leaf and a SecondaryAPN leaf, can be configured under the PrioritizedAPN node, to configure the ISMP node with more APN information. For example, assuming that the value of the AccessId leaf is CSG-ID1 and two APNs APN1 and APN2 are suggested for connection, an xml code for the policy node can be configured by the network 111 as follows:

```
<X>/Policy/<X>/PrioritizedAccess/<X>/AccessTechnology: 3GPP
<X>/Policy/<X>/PrioritizedAccess/<X>/AccessId: CSG-ID1
<X>/Policy/<X>/PrioritizedAPN/<X>/
<X>/Policy/<X>/PrioritizedAPN/<X>/FirstAPN: APN1
<X>/Policy/<X>/PrioritizedAPN/<X>/SecondaryAPN: APN2
```

Besides, the FirstAPN leaf and the SecondaryAPN leaf can also be configured under the PrioritizedAccess node for providing more APN information to the UE as follows:

```
<X>/Policy/<X>/PrioritizedAccess/<X>/AccessTechnology: 3GPP;
<X>/Policy/<X>/PrioritizedAccess/<X>/AccessId: CSG-ID1;
<X>/Policy/<X>/PrioritizedAccess/<X>/PrioritizedAPN/<X>/FirstAPN: APN1
<X>/Policy/<X>/PrioritizedAccess/<X>/PrioritizedAPN/<X>/SecondaryAPN: APN2
```

Please note that, even though the policy node is used in the examples for illustrating the present invention, the policy node can be replaced by the other policy nodes including the ForFlowBased node, the ForServiceBased node or the ForNonSeamlessOffload node. For example, the network 111 can configure a policy (i.e., a policy node) under the ISRP node for a ForServiceBased node with a RoutingRule node with an AccessTechnology leaf configured as the 3GPP, an AccessId leaf configured as a CSG identity, e.g., CSG-ID1, and a value of an APN leaf of a PrioritizedAPN node is APN1. That is, according to the process 100, an xml code for the ISRP node can be configured by the network 111 as follows:

```
<X>/ISRP/<X>/ForServiceBased/<X>/RoutingRule/AccessTechnology: 3GPP
<X>/ISRP/<X>/ForServiceBased/<X>/RoutingRule/AccessId: CSG-ID1
<X>/ISRP/<X>/ForServiceBased/<X>/PrioritizedAPN/<X>/
<X>/ISRP/<X>/ForServiceBased/<X>/PrioritizedAPN/<X>/APN: APN1
```

As shown in FIG. 5, two newly added leaves, i.e., a FirstAPN leaf and a SecondaryAPN leaf, are configured under a PrioritizedAPN node 506. Similarly, two newly added leaves, i.e. a FirstAPN leaf and a SecondaryAPN leaf, can be configured under a PrioritizedAPN node 608 in FIG. 6. For example, assume that a UE has a PDN connection associated to the APN APN1 via a P-GW in the EPC network. A home network with a L-GW can provide a PDN connection associated to the APN APN2. That is, the network 111 can provide the routing policies for the PDN connection via the APN APN2 as follows:

```
<X>/ISRP/<X>/ForServiceBased/<X>/APN: APN1
<X>/ISRP/<X>/ForServiceBased/<X>/RoutingRule/AccessTechnology:
3GPP
<X>/ISRP/<X>/ForServiceBased/<X>/RoutingRule/AccessId: CSG-ID1
<X>/ISRP/<X>/ForServiceBased/<X>/PrioritizedAPN/<X>/APN: APN2
```

Hence, when the UE is handover from a macrocell to a CSG cell, the UE can route its PDN connection from the P-GW in the EPC network to the L-GW in the home network.

On the other hand, a HomeAccessID leaf can be newly added under a PrioritizedAccess node for configuring a CSG identity, e.g., CSG-ID1, to avoid a situation that that the original AccessId leaf cannot be used due to format inconsistency. That is, an xml code for the policy node can be configured by the network 111 as follows:

```
<X>/Policy/<X>/PrioritizedAccess/<X>/AccessTechnology: 3GPP
<X>/Policy/<X>/PrioritizedAccess/<X>/HomeAccessId: CSG-ID1
<X>/Policy/<X>/PrioritizedAPN/<X>/
<X>/Policy/<X>/PrioritizedAPN/<X>/APN?
```

Please note that, even though the policy node is used in the examples for illustrating the present invention, the policy node can be replaced by the other policy nodes including the ForFlowBased node, the ForServiceBased node or the ForNonSeamlessOffload node. For example, the network 111 can configure a policy (i.e., a policy node) under the ISRP node for a ForServiceBased node with a RoutingRule node with an AccessTechnology leaf configured as the 3GPP, and a HomeAccessID leaf and a SecondaryHomeAccessID leaf configured as two CSG identities, e.g., CSG-ID1 and CSG-ID2, respectively. A value of an APN leaf of a PrioritizedAPN node is APN1. That is, according to the process 40, an xml code for the ISRP node can be configured by the network 111 as follows:

```
<X>/ISRP/<X>/ForServiceBased/<X>/RoutingRule/AccessTechnology:
3GPP
<X>/ISRP/<X>/ForServiceBased/<X>/RoutingRule/HomeAccessId:
CSG-ID1
<X>/ISRP/<X>/ForServiceBased/<X>/RoutingRule/<X>/
SecondaryHomeAccessId: CSG-ID2
<X>/ISRP/<X>/ForServiceBased/<X>/PrioritizedAPN/<X>/APN: APN1
```

Thus, according to the process 100 and the above description, the network 111 can provide routing policies to the UE, such that the UE can route its PDN connection from an original APN (associated to an original PDN) to the determined APN (associated to a new PDN), wherein the UE communicates with the original APN and the determined APN via a P-GW and an L-GW, respectively.

Figure 11:
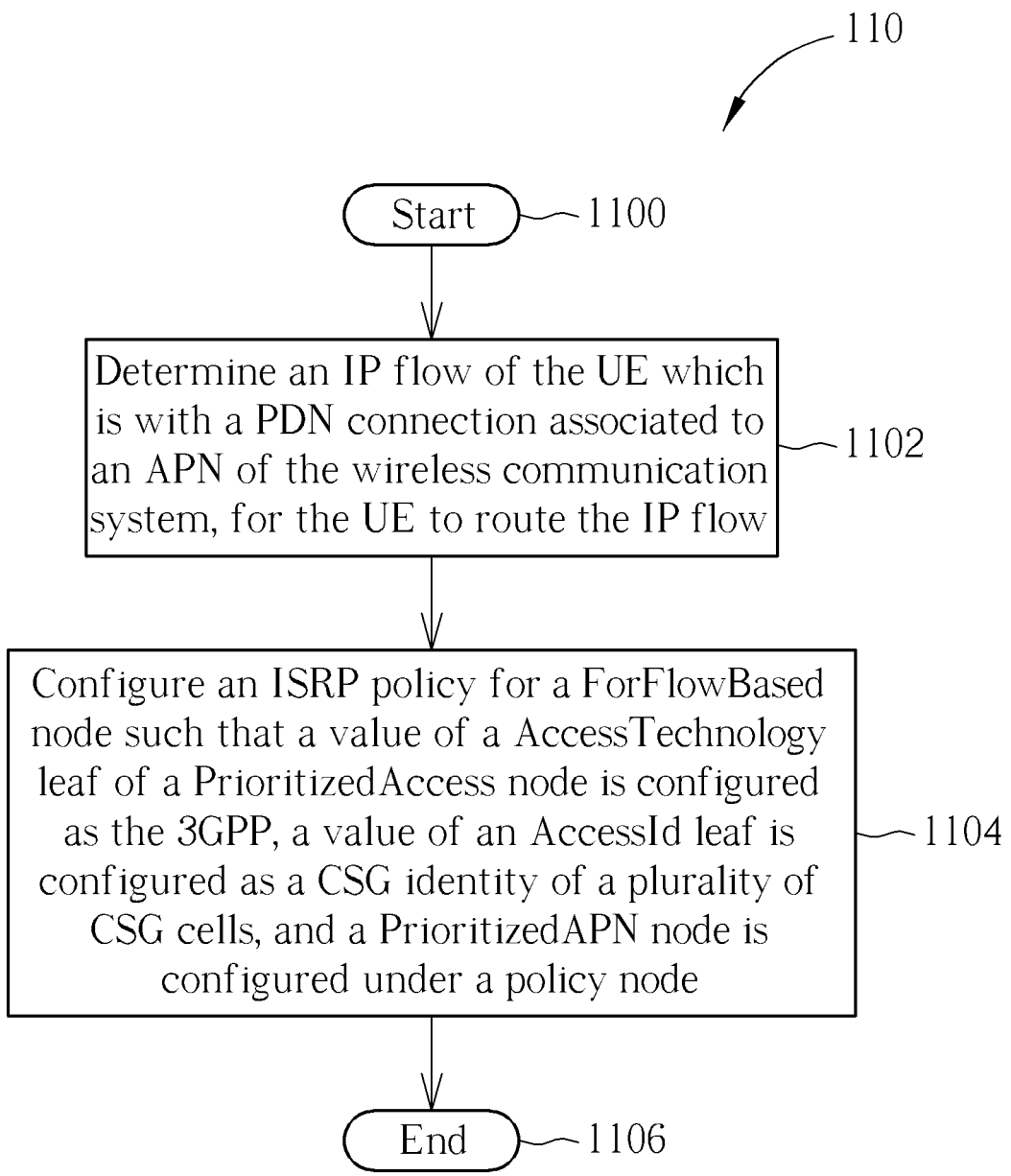
FIG. 11 is a flowchart of a process according to an example of the present invention.

Please refer to FIG. 11, which is a flowchart of a process 110 according to an example of the present in invention. The process 110 is utilized in the network 111 (i.e., the ANDSF server therein) shown in FIG. 1, to configure routing policies to a UE. The process 110 may be compiled into the program code 314 and includes the following steps:

Step 1100: Start.

Step 1102: Determine an IP flow of the UE which is with a PDN connection associated to an APN of the wireless communication system, for the UE to route the IP flow.

Step 1104: Configure an ISRP policy for a ForFlowBased node such that a value of an AccessTechnology leaf of a RoutingRule node is configured as the 3GPP, a value of an AccessId leaf is configured as a CSG identity of a plurality of CSG cells, and a PrioritizedAPN node is configured under a policy node for configuring the APN.

Step 1106: End.

According to the process 110, the network 111 determines an IP flow of the UE which is with a PDN connection associated to an APN of the wireless communication system, for the UE to route the IP flow. Then, the network 111 configures an ISRP policy for a ForFlowBased node such that a value of an AccessTechnology leaf of a RoutingRule node is configured as the 3GPP, a value of an AccessId leaf is configured as a CSG identity of a plurality of CSG cells, and a PrioritizedAPN node is configured under a policy node for configuring the APN, for the UE to route the IP flow.

In detail, the policy node can be the ForFlowBased node if the access technology is the 3GPP, and the policy node can be the ForNonSeamlessOffload node if the access technology is the wireless local area network (WLAN). For example, when the access technology is the 3GPP and a specific IP flow IPflow1 is considered, an xml code for the ISRP node can be configured by the network 111 as follows:

```
<X>/ISRP/<X>/ForFlowBased/<X>/IPFlow/<IPflow1>
<X>/ISRP/<X>/ForFlowBased/<X>/RoutingRule/<X>/AccessTechnology:
3GPP
<X>/ISRP/<X>/ForFlowBased/<X>/PrioritizedAPN/<X>/APN: APN1
```

When the access technology is the WLAN and a specific IP flow IPflow1 is determined, an xml code for the ISRP node can be configured by the network 111 as follows:

```
<X>/ISRP/<X>/ForNonSeamlessOffload/<X>/IPFlow/<IPflow1>
<X>/ISRP/<X>/ForNonSeamlessOffload/<X>/RoutingRule/<X>/
AccessTechnology: WLAN
<X>/ISRP/<X>/ForNonSeamlessOffload/<X>/PrioritizedAPN: APN1
```

Furthermore, more leaves, e.g., a FirstAPN leaf and a SecondaryAPN leaf can be configured under a PrioritizedAPN node, to provide a policy (i.e., a policy node) with more APN information. For example, assuming that values of the two APNs leaves suggested for connection are APN1 and APN2, an xml code for the policy node can be configured by the network 111 as follows:

```
<X>/ISRP/<X>/ForFlowBased/<X>/IPFlow/<IPflow1>
<X>/ISRP/<X>/ForFlowBased/<X>/RoutingRule/<X>/AccessTechnology:
3GPP
<X>/ISRP/<X>/ForFlowBased/<X>/RoutingRule/PrioritizedAPN/<X>/
FirstAPN: APN1
<X>/ISRP/<X>/ForFlowBased/<X>/RoutingRule/PrioritizedAPN/<X>/
Secondary APN: APN2
```

In this example, the UE can distribute (i.e., route) an IP flow IPflow1 to a 3GPP access with a PDN connection associated to an APN APN1 as the first option or an APN APN2 as the second option, if the UE has no PDN connection associated to the APN APN1.

For example, assuming that values of two APNs leaves suggested for connection are APN1 and APN2, an xml code for the policy node can be configured by the network 111 as follows:

```
<X>/ISRP/<X>/ForNonSeamlessOffload/<X>/IPFlow/<IPflow1>
<X>/ISRP/<X>/ForNonSeamlessOffload/<X>/RoutingRule/<X>/AccessId:
SSID1
<X>/ISRP/<X>/ForNonSeamlessOffload/<X>/RoutingRule/
PrioritizedAPN/<X>/FirstAPN: APN1
<X>/ISRP/<X>/ForNonSeamlessOffload/<X>/RoutingRule/
PrioritizedAPN/<X>/SecondaryAPN: APN2
```

In this example, the UE can distribute (i.e., route) an IP flow IPflow1 to a WLAN access via a WLAN access point with a SSID configured as SSID1, and the WLAN access can provide a PDN connection associated to an APN APN1 as the first option or an APN APN2 as the second option if the UE has no PDN connection associated to the APN APN1.

Please note that, in the above xml codes, the APN is configured under a PrioritizedAPN node which is newly added under the RoutingRule node of the ForFlowBased node or the ForNonSeamlessOffload node. However, a parent node under which the APN is configured not limited. For example, the PrioritizedAPN node can be added as a new leaf under the RoutingRule node as follows:

```
<X>/ISRP/<X>/ForFlowBased/<X>/RoutingRule/<X>/PrioritizedAPN:
APN1
<X>/ISRP/<X>/ForNonSeamlessOffload/<X>/RoutingRule/<X>/
PrioritizedAPN: APN1
```

Please note that, a single IP flow is illustrated in the above description. However, the present invention can be applied to multiple IP flows. For example, for a UE with both of 3GPP access and WLAN access, the network 111 can provide policies, for the UE to use the 3GPP access to route two IP flows IPflow1 and IPflow2 to an APN APN1 (e.g., via a P-GW) and an APN APN2 (e.g., via a L-GW), respectively. Alternatively, the network 111 can provide policies, for the UE to use the WLAN access with a specific SSID, e.g., SSID1, to route one IPflow, e.g., IPflow3, via the specific WLAN which can provide a PDN connection associated to an APN APN3. Accordingly, an xml code for the ISRP node can be configured by the network 111 as follows:

```
<X>/ISRP/<X>/ForFlowBased/<X>/IPFlow/<IPflow1>
<X>/ISRP/<X>/ForFlowBased/<X>/RoutingRule/<X>/AccessTechnology:
3GPP
<X>/ISRP/<X>/ForFlowBased/<X>/RoutingRule/<X>/PrioritizedAPN:
APN1
<X>/ISRP/<X>/ForFlowBased/<X>/IPFlow/<IPflow2>
<X>/ISRP/<X>/ForFlowBased/<X>/RoutingRule/<X>/AccessTechnology:
3GPP
<X>/ISRP/<X>/ForFlowBased/<X>/RoutingRule/<X>/PrioritizedAPN:
APN2
<X>/ISRP/<X>/ForFlowBased/<X>/IPFlow/<IPflow3>
<X>/ISRP/<X>/ForFlowBased/<X>/RoutingRule/<X>/AccessTechnology:
WLAN
<X>/ISRP/<X>/ForFlowBased/<X>/RoutingRule/<X>/AccessId: SSID1
<X>/ISRP/<X>/ForFlowBased/<X>/RoutingRule/<X>/PrioritizedAPN:
APN3
```

Thus, according to the process 110 and the above description, the network 111 can provide routing policies to the UE, such that the UE can route one or more IP flows to one or more APNs, wherein the UE communicates with the one or more APNs via a P-GW or an L-GW.

According to the above description, the network 111 can determine and configure at least one policy node, including the ISMP node, the ForFlowBased node and the ForNonSeamlessOffload node, and transmits the at least one policy node to the UE. After receiving the at least one policy node from the network 111, the UE can select one of the at least one policy node, for communicating with the network 111 (e.g., the EPC network therein or WLAN with or without a specific SSID) by using information (e.g., APN and/or CSG identity) indicated in the one of the at least one policy node, e.g., the ISMP node, the ForFlowBased node and the ForNonSeamlessOffload node.

Figure 12:
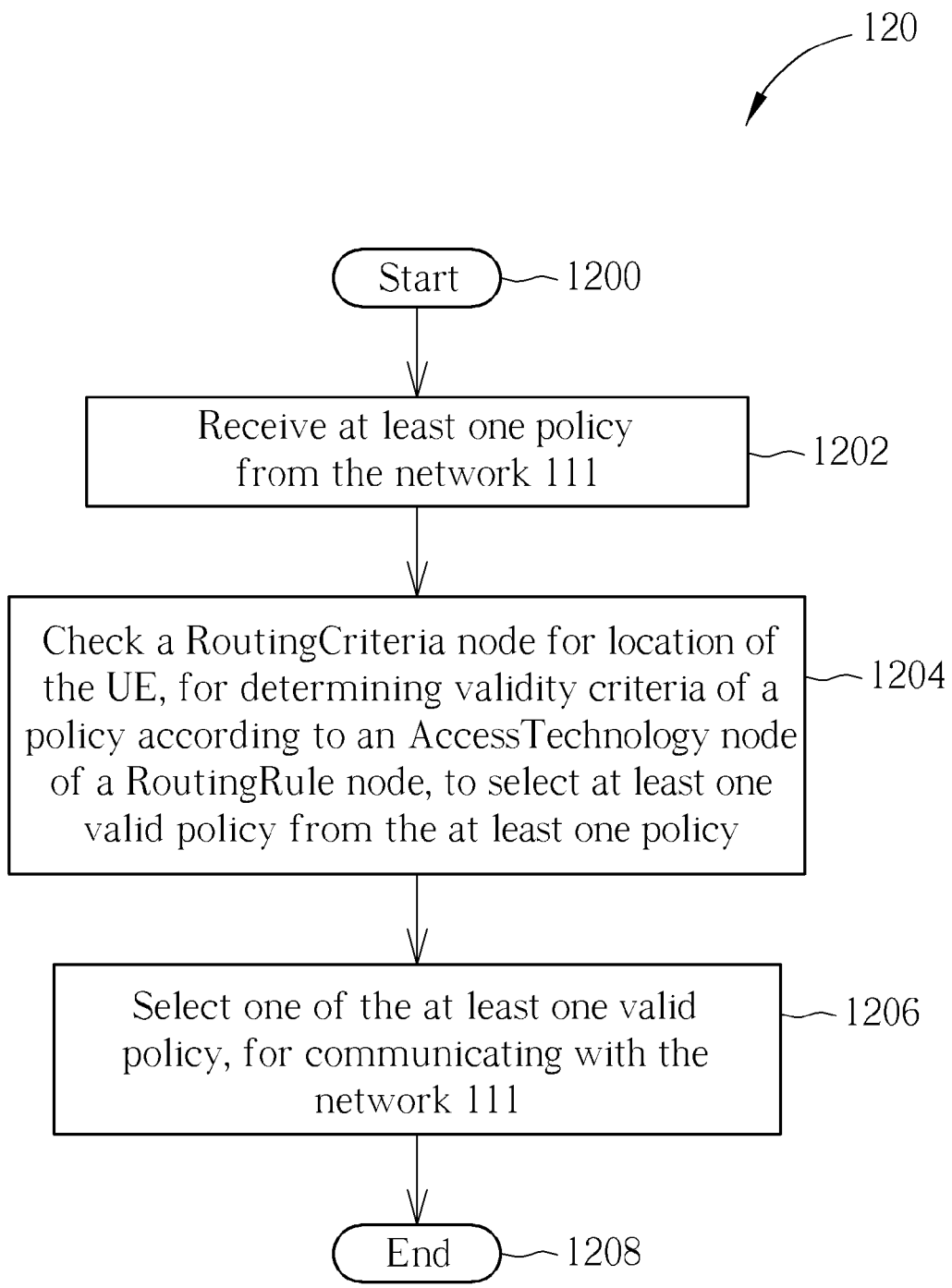
FIG. 12 is a flowchart of a process according to an example of the present invention.

Please refer to FIG. 12, which is a flowchart of a process 120 according to an example of the present invention. The process 120 is utilized in the UE shown in FIG. 1, for handling the policies received from the network 111. The process 120 may be compiled into the program code 314 and includes the following steps:

Step 1200: Start.

Step 1202: Receive at least one policy from the network 111.

Step 1204: Check a RoutingCriteria node for location of the UE, for determining validity criteria of a policy according to an AccessTechnology node of a RoutingRule node, to select at least one valid policy from the at least one policy.

Step 1206: Select one of the at least one valid policy, for communicating with the network 111.

Step 1208: End.

According to the process 120, after the UE receives at least one policy from the network 111, the UE checks a RoutingCriteria node for location of the UE, for determining validity criteria of a policy according to an AccessTechnology node of a RoutingRule node, to select at least one valid policy from the at least one policy. Then, the UE can select one of the at least one valid policy, for communicating with the network 111. In other words, after the UE receives at least one policy from the network 111, the UE checks RoutingCriteria for location of the UE, e.g., 3GPP location with a specific CSG identity, as a policy validity criteria according to an indicated AccessTechnology of a RoutingRule node, e.g., an AccessTechnology node indicates 3GPP access and an AccessId node indicates a CSG identity, e.g., CSG-ID1. For example, if the UE is located in a 3GPP access coverage of a CSG cell with a CSG identity CSG-ID1, the policy is considered valid. Then, the UE can select one of the valid policies, for communicating with the network 111.

Those skilled in the art should readily make combinations, modifications and/or alterations on the abovementioned examples. The abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), and the communication device 30.

To sum up, the present invention provides a method of handling an ANDSF for the network. The network can configure and provide the ANDSF to a UE. Then, the UE can determine a CSG cell according to the ANDSF provided by the network. Further, the UE can determine how to route a PDN connection and an IP flow according to the ANDSF provided by the network.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling an access network discovery and selection function (ANDSF) for a network of a wireless communication system, the method comprising:

determining a first plurality of closed subscriber group (CSG) cells of the wireless communication system with a first CSG identity when a mobile device is a CSG member and locates in coverage of a macro evolved universal terrestrial radio access (EUTRA) cell and the first plurality of CSG cells with the first CSG identity, for the mobile device of the wireless communication system to communicate with an evolved packet core (EPC) network of the wireless communication system via the first plurality of CSG cells, after the network determines the 3rd Generation Partnership Project (3GPP) as an access technology for the mobile device; and configuring an inter-system mobility policy (ISMP) node such that a value of an AccessTechnology leaf of a PrioritizedAccess node is configured as the 3GPP, and a value of a first AccessId leaf of the PrioritizedAccess node is configured as the first CSG identity of the first plurality of CSG cells.

2. The method of claim 1, wherein the ISMP node is a policy node, a ForFlowBased node of an inter-system routing policy (ISRP) node or a ForServiceBased node of the ISRP node.

3. The method of claim 2, wherein the PrioritizedAccess node is a RoutingRule node, when the ISMP node is the ForFlowBased node.

4. The method of claim 2, wherein the PrioritizedAccess node is a RoutingRule node, when the ISMP node is the ForServiceBased node.

5. The method of claim 1, further comprising:

determining a second plurality of CSG cells of the wireless communication system with a second CSG identity, for the mobile device to communicate with the EPC network via the second plurality of CSG cells; and configuring the ISMP node such that a value of a second AccessId leaf of the PrioritizedAccess node is configured as the second CSG identity of the second plurality of CSG cells.

6. The method of claim 1, wherein the first AccessId leaf is configured under the PrioritizedAccess node, for configuring the first CSG identity.

7. The method of claim 1, further comprising:

arranging a new leaf under a 3GPP_Location node of a ValidityArea node of the ISMP node, for configuring the first CSG identity.

8. The method of claim 1, further comprising:

arranging a new leaf under a 3GPP_Location node of an AccessNetworkArea node of a DiscoveryInformation node, for configuring the first CSG identity.

9. The method of claim 1, further comprising:

arranging a new leaf under a 3GPP_Location leaf of a UE_Location node, for configuring the first CSG identity.

10. The method of claim 1, wherein the first plurality of CSG cells are determined according to a CSG membership of the mobile device, a user's subscription of a user of the mobile device or an operator configuration of the wireless communication system.

* * * * *